United States Patent
Chang et al.

(10) Patent No.: US 8,972,970 B2
(45) Date of Patent: Mar. 3, 2015

(54) FIRMWARE OVERWRITING METHOD IN PAIRED USE WIRELESS MICROPHONE AND RECEIVER

(75) Inventors: Sheng-Hsiung Chang, New Taipei (TW); Sheng-Yuan Chang, New Taipei (TW)

(73) Assignee: Taiwan Gomet Technology Co. Ltd., New Taipei (TW)

( * ) Notice: Subject to any disclaimer, the term of this patent is extended or adjusted under 35 U.S.C. 154(b) by 208 days.

(21) Appl. No.: 13/539,776

(22) Filed: Jul. 2, 2012

(65) Prior Publication Data

US 2014/0007071 A1  Jan. 2, 2014

(51) Int. Cl.
*G06F 9/44*  (2006.01)
*G06F 9/445*  (2006.01)

(52) U.S. Cl.
USPC ............................ 717/170; 717/171; 717/174

(58) Field of Classification Search
USPC ......... 455/90.1, 411, 420; 717/168, 170–176; 381/315
See application file for complete search history.

(56) References Cited

U.S. PATENT DOCUMENTS

| | | | |
|---|---|---|---|
| 6,360,362 B1 * | 3/2002 | Fichtner et al. ................ | 717/168 |
| 2003/0217358 A1 * | 11/2003 | Thurston et al. ............... | 717/174 |
| 2004/0107418 A1 * | 6/2004 | Suda et al. ..................... | 717/176 |
| 2004/0237081 A1 * | 11/2004 | Homiller ........................ | 717/170 |
| 2005/0272418 A1 * | 12/2005 | Vinson et al. ................. | 455/420 |
| 2006/0116107 A1 * | 6/2006 | Hulvey .......................... | 455/411 |
| 2009/0119657 A1 * | 5/2009 | Link, II ......................... | 717/171 |
| 2009/0260001 A1 * | 10/2009 | Park et al. ..................... | 717/173 |
| 2010/0297964 A1 * | 11/2010 | Austin et al. ................. | 455/90.1 |
| 2011/0072423 A1 * | 3/2011 | Fukata .......................... | 717/172 |
| 2011/0154313 A1 * | 6/2011 | Nolterieke et al. ........... | 717/170 |
| 2011/0188684 A1 * | 8/2011 | Spieler et al. ................ | 381/315 |

* cited by examiner

*Primary Examiner* — Lewis A Bullock, Jr.
*Assistant Examiner* — Gilles Kepnang
(74) *Attorney, Agent, or Firm* — Saliwanchik, Lloyd & Eisenschenk

(57) ABSTRACT

A firmware overwriting method for paired use wireless microphone and receiver is disclosed. The firmware update method comprises building a wireless connection between the at least one wireless microphone and the at least one receiver; and executing the determining program by the receiver processing module to determine if the installed wireless microphone compatible backup firmware is the same as the wireless microphone firmware. If yes, the overwriting program is not executed. If no, the receiver processing module sends a command to the wireless microphone processing module to download the installed wireless microphone compatible backup firmware from the receiver storage module, and the overwriting program is executed by the wireless microphone processing module to overwrite the wireless microphone firmware with the installed wireless microphone compatible backup firmware.

7 Claims, 6 Drawing Sheets

FIRMWARE OVERWRITING METHOD IN PAIRED USE WIRELESS MICROPHONE AND RECEIVER

BACKGROUND OF THE INVENTION

1. Field of the Invention

The present invention generally relates to a firmware overwriting method, in particular to a firmware overwriting method in paired use wireless microphone and receiver.

2. Description of the Related Art

In wireless microphone system, firmware is generally the combination of read-only memory (ROM) and program code installed in non-volatile memory unit to control and drive the wireless microphone and receiver. Nowadays, wireless microphone systems advance at a tremendous pace. Thus, the firmware usually becomes outdated when the customer gets the wireless microphone system. Accordingly, updated firmware is required to fix bugs or add features to the wireless microphone system.

To update firmware, a firmware update file is required to overwrite the old firmware or the firmware with bugs. However, under conventional method for updating firmware, only one wireless microphone or receiver can be updated at a time. Therefore, the time and process required for updating firmware can be long and exhaustive when there are numerous wireless microphones and receivers with various models to be updated. In particular, it would be a logistical nightmare to keep track of which wireless microphone and receiver need to be updated, have already been updated or are compatible with the firmware updated. Thus, under conventional method for updating firmware, maintaining each of the wireless microphone and the receiver updated is very labor intensive and prone to mishandling and human error.

Particularly, in the paired use wireless microphone system, the user or the administrator shall update firmware in each master unit and slave unit of the paired use wireless microphone and receiver, respectively. When there are serious bugs or new features introduced, the great amount of modifications make the old version and the new version of the firmware incompatible with each other. Because of the appearances of each of the wireless microphone and receiver are the same, it is difficult for the user or the administrator to manage or discriminate which Receiver unit or Microphone unit can or cannot be used in pair. Especially, the version of the firmware may be out of control when updating too many times.

In the paired use wireless microphone system, if different versions of firmwares or incompatible firmwares were used in each paired use wireless microphone and receiver, it will not work properly or may have many problems when these paired use wireless microphone and receiver are used in pair, even though the firmware of one of the paired use wireless microphone is newer then that of the receiver. Therefore, the paired use wireless microphone and receiver may not function well unless the paired use wireless microphone and receiver have all new, all old or compatible firmwares.

BRIEF SUMMARY

Therefore, it is a primary objective of the present invention to provide a firmware overwriting method applicable for paired use wireless microphone and receiver to achieve the effect of reducing time and process for overwriting and managing the firmware in paired use wireless microphone and receiver. Especially, the firmware overwriting method applicable for paired use wireless microphone and receiver is applied in a closed system, which only builds connections for firmware overwriting between the paired use wireless microphone and receiver.

To achieve the foregoing objective, the present invention provides a firmware overwriting method applicable for paired use wireless microphone and receiver. The at least one wireless microphone comprises a wireless microphone processing module, a wireless microphone wireless transceiver module and a wireless microphone storage module for storing a wireless microphone firmware and an overwriting program. The at least one receiver comprises a receiver processing module, a receiver wireless transceiver module and a receiver storage module for storing a determining program, an installed receiver firmware and an installed wireless microphone compatible backup firmware. The firmware overwriting method applicable for the paired use wireless microphone and receiver may comprise: building a wireless connection between the at least one wireless microphone and the at least one receiver; executing the determining program to determine if the installed wireless microphone compatible backup firmware is the same as the wireless microphone firmware by the receiver processing module; in response to the installed wireless microphone compatible backup firmware is determined to be the same as the wireless microphone firmware, the overwriting program is not executed by the wireless microphone processing module; and in response to the installed wireless microphone compatible backup firmware is determined to be different from the wireless microphone firmware, the receiver processing module sends a command to the wireless microphone processing module to download the installed wireless microphone compatible backup firmware from the receiver storage module, and the overwriting program is executed by the wireless microphone processing module to overwrite the wireless microphone firmware stored in the wireless microphone storage module with the installed wireless microphone compatible backup firmware.

In a preferred embodiment of the present invention, the firmware overwriting method may further comprise a step of installing a firmware package of a wireless microphone compatible backup firmware and a receiver firmware in the receiver storage module by the receiver processing module before building the wireless connection.

In a preferred embodiment of the present invention, the firmware package may be installed in the receiver storage module while the installed receiver firmware is overwritten by the receiver firmware through connecting to a computer with a wire or wireless.

In a preferred embodiment of the present invention, the firmware package may further comprise a firmware version compatible lookup table or a version number digital discriminator.

In a preferred embodiment of the present invention, the firmware overwriting method may further comprise executing the determining program by the receiver processing module to search the firmware version compatible lookup table for determining whether a version number of the wireless microphone firmware is listed in the firmware version compatible lookup table after the installed wireless microphone compatible backup firmware is determined to be different from the wireless microphone firmware by the determining program; in response to the version number of the wireless microphone firmware is determined to be listed in the firmware version compatible lookup table, the overwriting program is not executed by the first processing module; and in response to the version number of the wireless microphone firmware is determined to be not listed in the firmware version compatible lookup table, the receiver processing module sends a command to the wireless microphone processing module to download the installed wireless microphone compatible backup firmware from the receiver storage module, and the overwriting program is executed by the wireless microphone processing module to overwrite the wireless microphone firmware stored in the wireless microphone storage module with the installed wireless microphone compatible backup firmware downloaded from the receiver storage module.

In a preferred embodiment of the present invention, the wireless connection may be built through WiFi, radio frequency and Bluetooth.

In a preferred embodiment of the present invention, the at least one wireless microphone and the at least one receiver may be paired together by way of one-to-one, one-to-multiple or multiple-to-multiple.

The firmware overwriting method for paired use wireless microphone and receiver according to the present invention adopt a firmware package including a receiver firmware and a wireless microphone compatible backup firmware, so that the present invention has the following advantages:

(1) The firmware overwriting method for paired use wireless microphone and receiver of the present invention can be used to keep the firmware in each of the paired use wireless microphone and receiver to be matched with each other automatically and immediately without dysfunction due to incompatible problems of various firmware versions.

(2) The firmware overwriting method for paired use wireless microphone and receiver of the present invention may reduce the time and the effort for the users to update the firmware in each of the paired use wireless microphone and receiver.

(3) The firmware overwriting method for paired use wireless microphone and receiver of the present invention may be used by the administrators for efficiently managing the paired use wireless microphone and receiver with firmwares of various versions.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION

The technical content of the present invention will become apparent by the detailed description of the following embodiments and the illustration of related drawings as follows. The embodiments may be in different forms and should not be construed as limited to the embodiments set forth herein.

Figure 1:
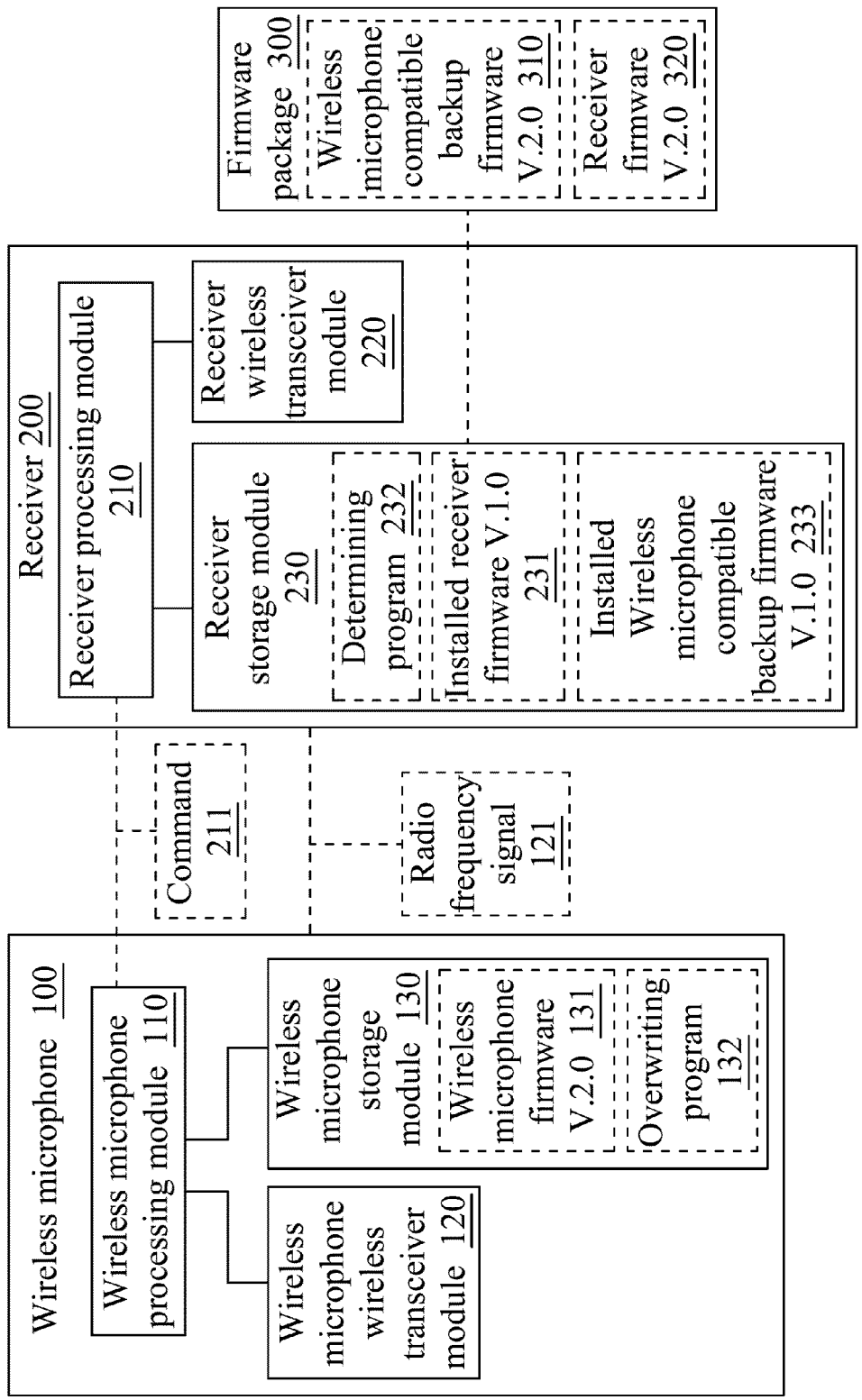
FIG. 1 is a block diagram of paired use wireless microphone and receiver in a firmware overwriting method in accordance with one embodiment of the present invention.

With reference to FIG. 1 for a block diagram of a firmware overwriting method for paired use wireless microphone and receiver in accordance with one embodiment of the present invention, the paired use wireless microphone and receiver are embodied with a receiver 200 and a wireless microphone 100 by way of one-to-one. The wireless microphone 100 comprises a wireless microphone processing module 110, a wireless microphone wireless transceiver module 120 electrically coupled to the wireless microphone processing module 110 for sending a radio frequency signal 121, and a wireless microphone storage module 130 electrically coupled to the wireless microphone processing module 110 for storing a wireless microphone firmware 131 and an overwriting program 132. The receiver 200 comprises a receiver processing module 210, a receiver wireless transceiver module 220 electrically coupled to the receiver processing module 210 for receiving the radio frequency signal 121 to build a wireless connection to the wireless microphone 100, and a receiver storage module 230 electrically coupled to the receiver processing module 210 for storing a determining program 232, an installed receiver firmware 231 and an installed wireless microphone compatible backup firmware 233. In the preferred embodiment, the receiver 200 and the wireless microphone 100 pair together by way of one-to-one. The receiver 200 and the wireless microphone 100 are driven by an installed receiver firmware 231 and a wireless microphone firmware 131, respectively. In addition, the installed wireless microphone compatible backup firmware 233 in the receiver storage module 230 is either the same as or compatible with the installed receiver firmware 231.

In an embodiment, the version of the installed wireless microphone compatible backup firmware 233 is older one, e.g. V 1.0. When a wireless microphone 100 with wireless microphone firmware 131 of a newer version, e.g. V 2.0, is used to connect with the receiver 200, the determining program 232 stored in the receiver storage module 230 is executed by the receiver processing module 210 to determine if the installed wireless microphone compatible backup firmware 233 is the same as the wireless microphone firmware 131. In the instant embodiment, the firmware versions of the installed wireless microphone compatible backup firmware 233 and the wireless microphone firmware 131 are determined to be different from each other. Accordingly, the receiver processing module 210 delivers a command 211 to the wireless microphone processing module 110 to download the installed wireless microphone compatible backup firmware 233 of V 1.0 from the receiver storage module 230. Soon after that, the overwriting module 132 is executed by the wireless microphone processing module 110 to overwrite the wireless microphone firmware 131 of V 2.0, which is a newer version, with the installed wireless microphone compatible backup firmware 233 of V 1.0, which is an older version.

Much as the version of the wireless microphone firmware 131 is turned into the older version, the wireless microphone 100 with the wireless microphone firmware 131 of V 1.0 functions well with the receiver 200 with the installed receiver firmware 231 of V 1.0. The users of the wireless microphone 100 and the receiver 200 may continue working instead of going back to office to replace the present wireless microphone 100 and receiver 200 with other ones with the same version of firmware.

In an embodiment, when the wireless microphone firmware 131 and the installed receiver firmware 231, of which the firmware version are V 1.0, need to be changed or to be updated to a new version in each of the receiver 100 and the wireless microphone 200, a firmware package 300 is installed in the receiver storage module 230 after connecting the receiver 200 to a computer with a wire or wirelessly. In a preferred embodiment, the firmware package 300 may be installed in the receiver storage module 230 to overwrite the installed receiver firmware 231 and the installed wireless microphone compatible backup firmware 233 with the receiver firmware 320 and the wireless microphone compatible backup firmware 310, respectively, by connecting the receiver 200 to a computer with a wire or wirelessly. In the instant embodiment, the receiver 200 connects to the computer with a wire and should not be construed as limited to the embodiments set forth herein. Wherein, the firmware package 300 comprises a receiver firmware 320 and a wireless microphone compatible backup firmware 310, of which the firmware version are V 2.0.

After installing the update package 300 to the receiver 200, the receiver 200 is driven by the receiver firmware 320. Then, the user may use the wireless microphone 100 to connect to the receiver 200. When the wireless microphone wireless transceiver module 120 sends a radio frequency signal 121 to the receiver wireless transceiver module 220, the receiver wireless transceiver module 220 receives the radio frequency signal 121 and builds a wireless connection to the wireless microphone 100. In a preferred embodiment, the wireless connection may be built through WiFi, radio frequency and Bluetooth. In the instant embodiment, the wireless connection is built through radio frequency and should not be construed as limited to the embodiments set forth herein.

When the wireless connection is built between the receiver 200 and the wireless microphone 100, receiver processing module 210 may execute the determining program 232 in the receiver storage module 230 to determine if the wireless microphone compatible backup firmware 310 is the same as the wireless microphone firmware 131. In the instant embodiment, the wireless microphone compatible backup firmware 310 is the different from the wireless microphone firmware 131. Thus, the receiver processing module 210 sends a command 211 to the wireless microphone processing module 110 to download the wireless microphone compatible backup firmware 310 from the receiver storage module 230, and the overwriting program 132 is executed by the wireless microphone processing module 110 to download the wireless microphone compatible backup firmware 310 from the receiver storage module 230. Consequently, the wireless microphone firmware 131 stored in the wireless microphone storage module 130 will be overwritten with the wireless microphone compatible backup firmware 310 downloaded from the receiver storage module 230, no matter which the wireless microphone compatible backup firmware 310 is older or newer than the wireless microphone firmware 131.

In a preferred embodiment, the paired use wireless microphone and receiver may be paired together by way of one-to-one, one-to-multiple or multiple-to-multiple and should not be construed as limited to the embodiments set forth herein.

Figure 2:
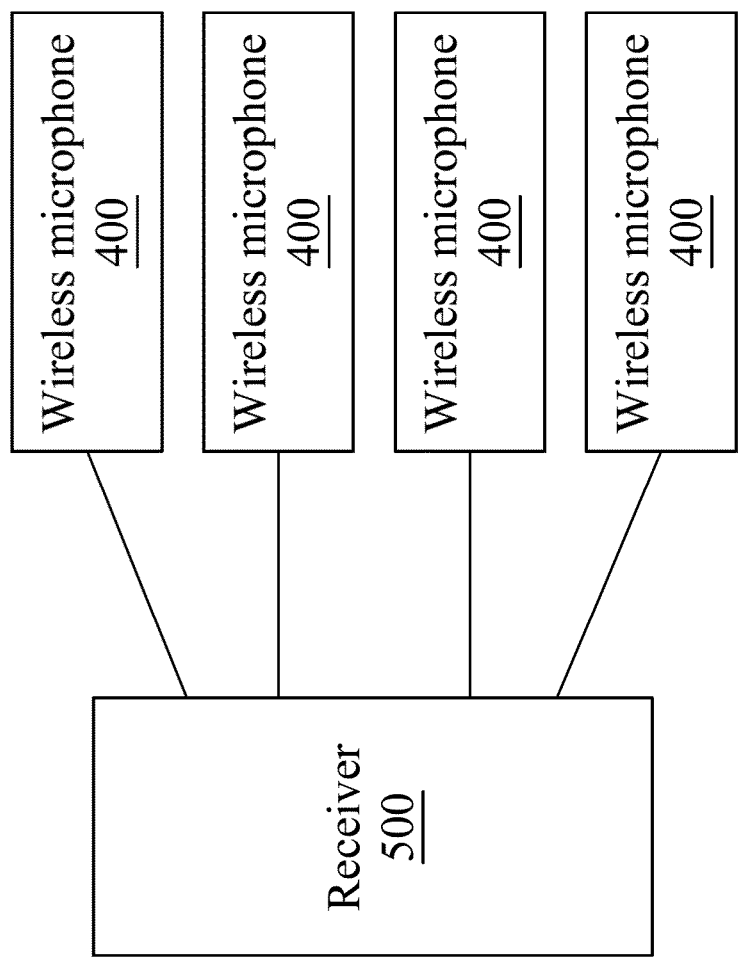
FIG. 2 is a schematic view of a firmware overwriting method for paired use wireless microphone and receiver in accordance with one embodiment of the present invention.

With reference to FIG. 2 for a schematic view of a firmware overwriting method for paired use wireless microphone and receiver in accordance with one embodiment of the present invention, the linkages and effects of the elements with the similar respective numerals of this preferred embodiment are similar to those as depicted in FIG. 1, and thus will not be repeated. However, the differences of this preferred embodiment comparing to FIG. 1 reside on that the receiver 500 and the wireless microphones 400 are paired together by way of one-to-multiple. After installing the firmware package 300 to the receiver 500, the receiver 500 is driven by the receiver firmware 320. Then, the user may use the plurality of wireless microphones 400 to connect to the receiver 500 simultaneously. Hence, the wireless microphone firmware 131 will be overwritten with the wireless microphone compatible backup firmware 310 when they are determined to be different from each other. As a result, the firmware version of the plurality of wireless microphones 400 will be matched with the receiver 500 whenever the users use the plurality of wireless microphones 400.

Figure 3A:
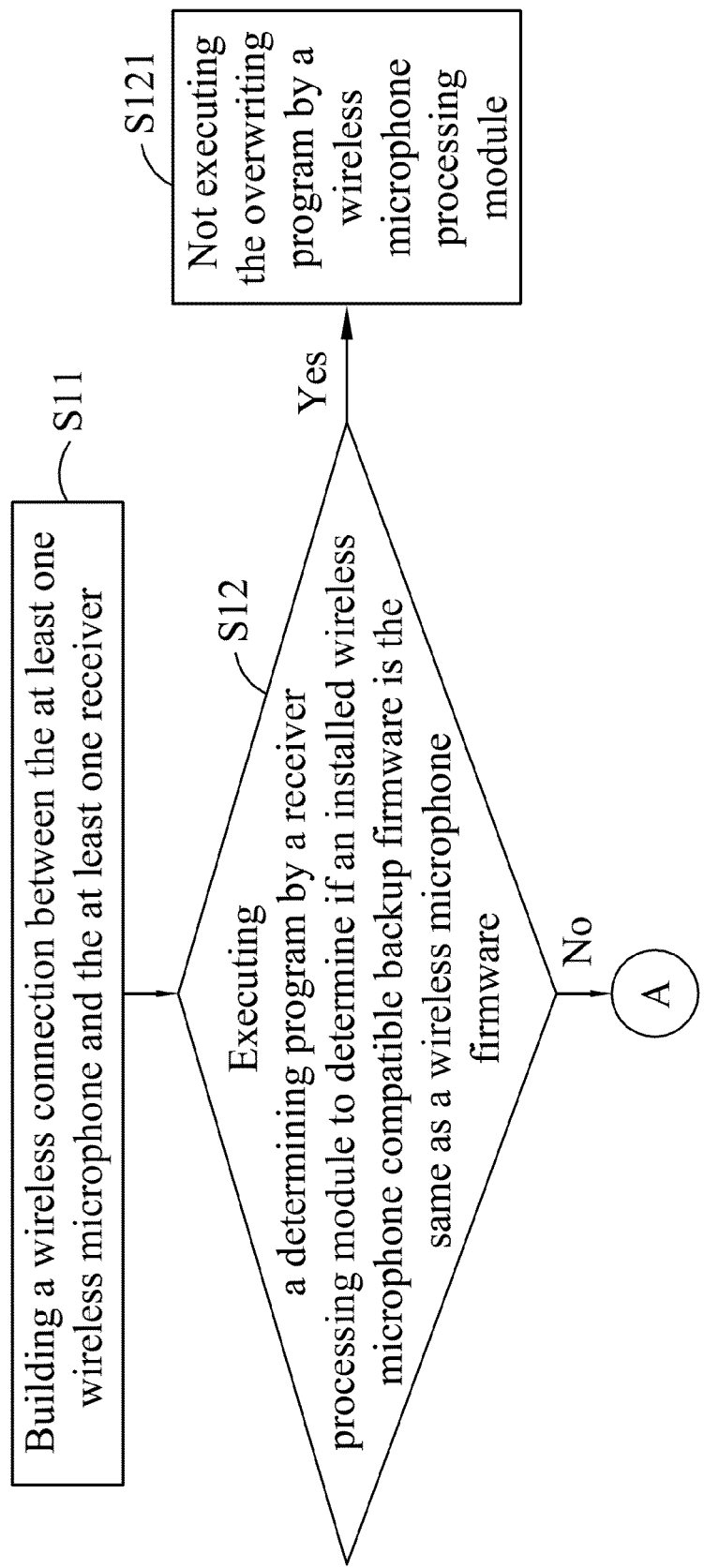
FIGS. 3A and 3B are flow charts of a firmware overwriting method applicable for paired use wireless microphone and receiver in accordance with one embodiment of the present invention.
Figure 3B:
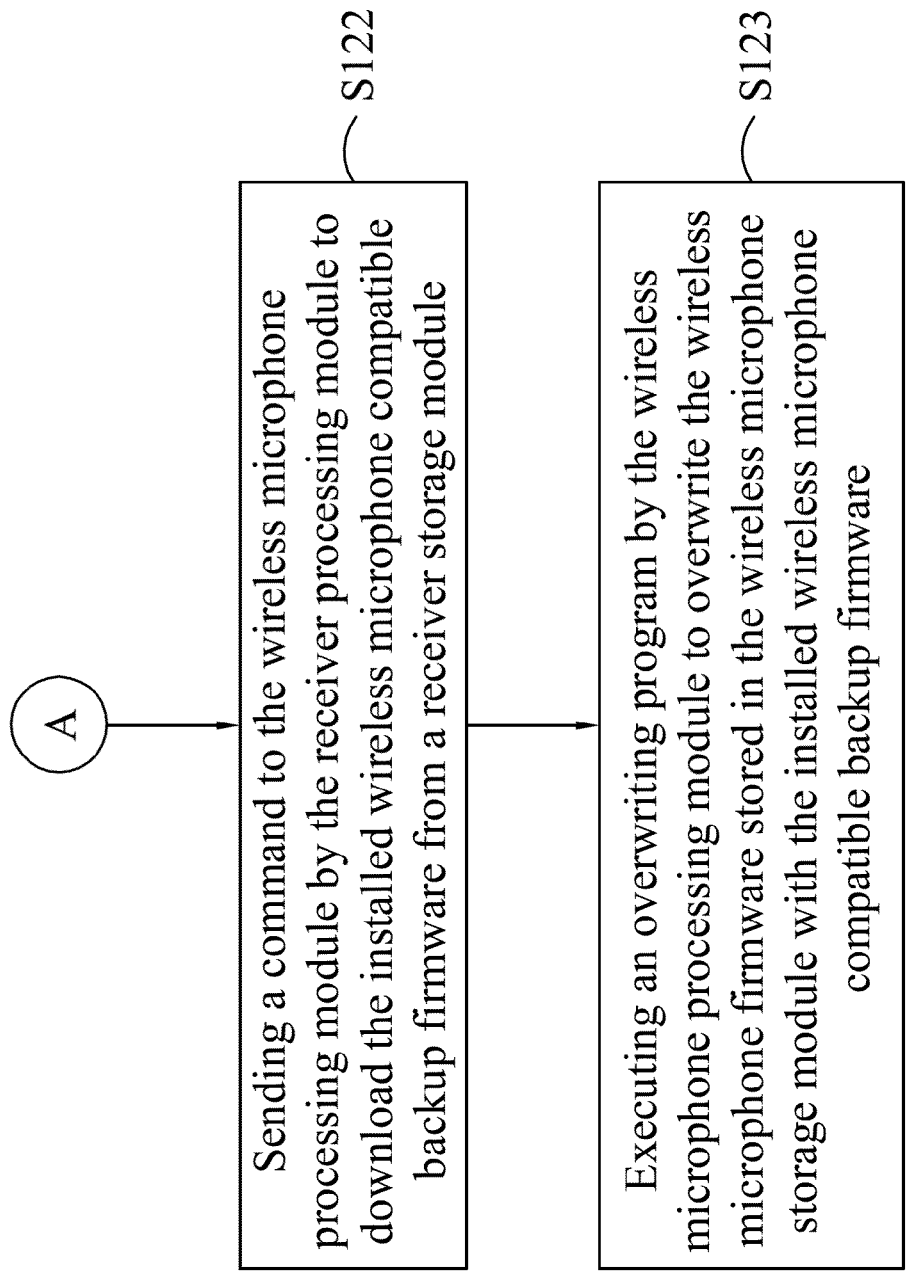

With reference to FIGS. 3A and 3B for flow charts of a firmware overwriting method applicable for paired use wireless microphone and receiver in accordance with one embodiment of the present invention, for the purpose of brief description, the details of the paired use wireless microphone and receiver, which are similar to those as depicted in FIG. 1, will not be further described herein. The firmware overwriting method applicable for paired use wireless microphone and receiver in accordance with one embodiment of the present invention comprises the following steps: S11: building a wireless connection between the at least one wireless microphone and the at least one receiver; S12: executing a determining program by a receiver processing module to determine if an installed wireless microphone compatible backup firmware is the same as a wireless microphone firmware; S121: not executing the overwriting program by a wireless microphone processing module; S122: sending a command to the wireless microphone processing module by the receiver processing module to download the installed wireless microphone compatible backup firmware from a receiver storage module; and S123: executing an overwriting program by the wireless microphone processing module to overwrite the wireless microphone firmware stored in the wireless microphone storage module with the installed wireless microphone compatible backup firmware.

In a preferred embodiment of the present invention, the firmware package may further comprise a firmware version compatible lookup table or a version number digital discriminator. Moreover, after the installed wireless microphone compatible backup firmware is determined to be different from the wireless microphone firmware by the determining program, the receiver processing module may further execute the determining program to search the firmware version compatible lookup table for determining whether a version number of the wireless microphone firmware is listed in the firmware version compatible lookup table. If yes, the overwriting program may not be executed by the wireless microphone processing module. If no, the receiver processing module sends a command to wireless microphone processing module to download the installed wireless microphone compatible backup firmware from the receiver storage module, and the overwriting program may be executed by the wireless microphone processing module to overwrite the wireless microphone firmware stored in the wireless microphone storage module with the installed wireless microphone compatible backup firmware stored in the wireless microphone storage module.

In addition, the version number may comprise two sections, which are major version number and sub version number. For example, the version number may be "12.100", in which "12" is the major version number and "100" is the sub version number. When the major version number, rather than the sub version number, is different from each other, the firmware version is determined to be incompatible by the version number digital discriminator. In an embodiment, the version number digital discriminator may be installed in the receiver storage module while installing the firmware package. After the installed wireless microphone compatible backup firmware is determined to be different from the wireless microphone firmware by the determining program, the receiver processing module may further execute the version number digital discriminator to discriminate the differences of the version number between the receiver firmware and the wireless microphone firmware. That is, the version number digital discriminator may be executed to determine whether the major version numbers of the receiver firmware and the wireless microphone firmware are the same or not. For example, the version number of receiver firmware is "4.36" and the version number of the wireless microphone firmware is "4.57". Although the sub version numbers are different, i.e. "0.36" and "0.57", the major version numbers are the same, i.e. "4". Therefore, the receiver firmware and the wireless microphone firmware are determined to be compatible with each other.

Figure 4A:
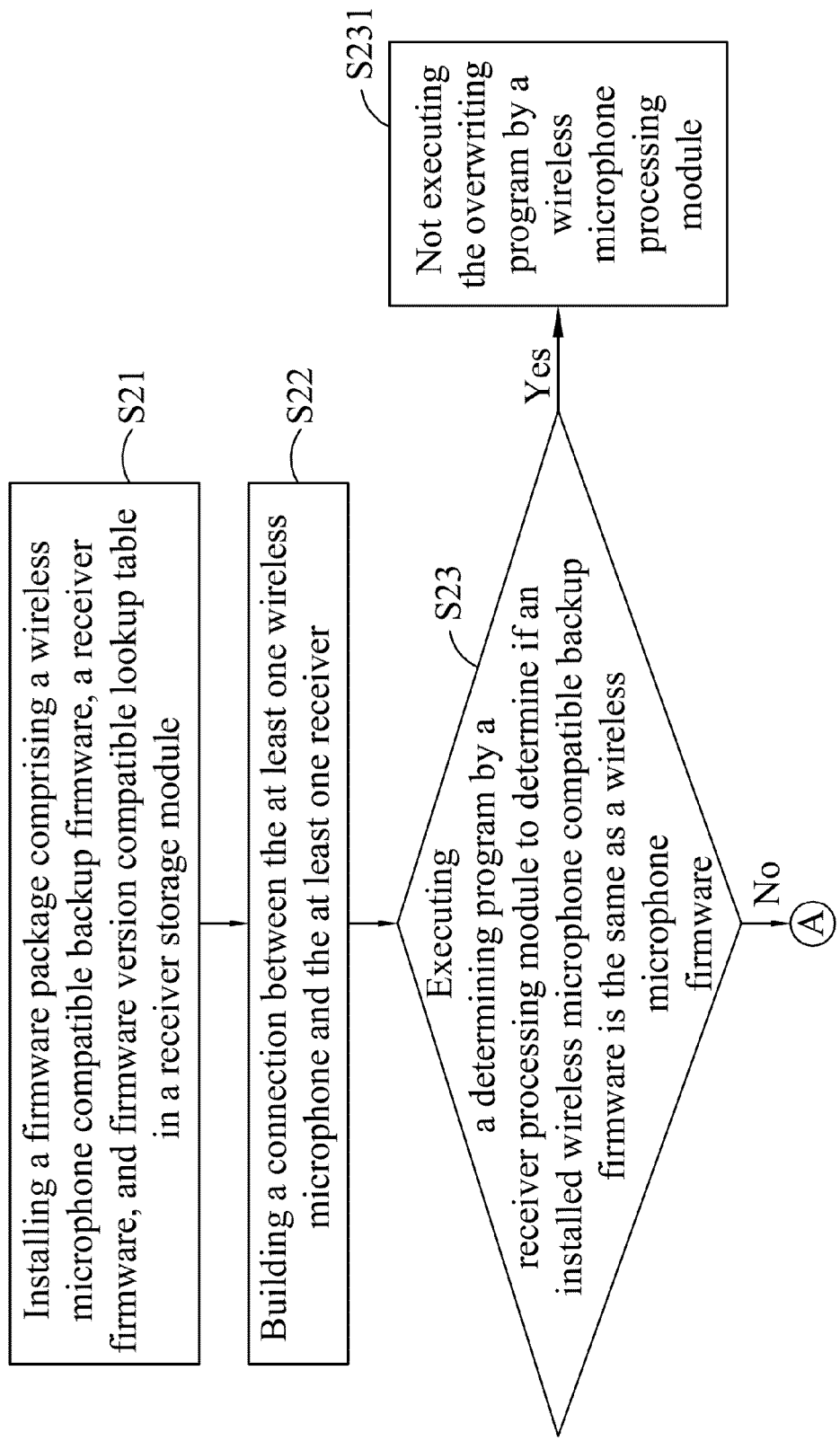
FIGS. 4A and 4B are flow charts of a firmware overwriting method applicable for paired use wireless microphone and receiver in accordance with one embodiment of the present invention.
Figure 4B:
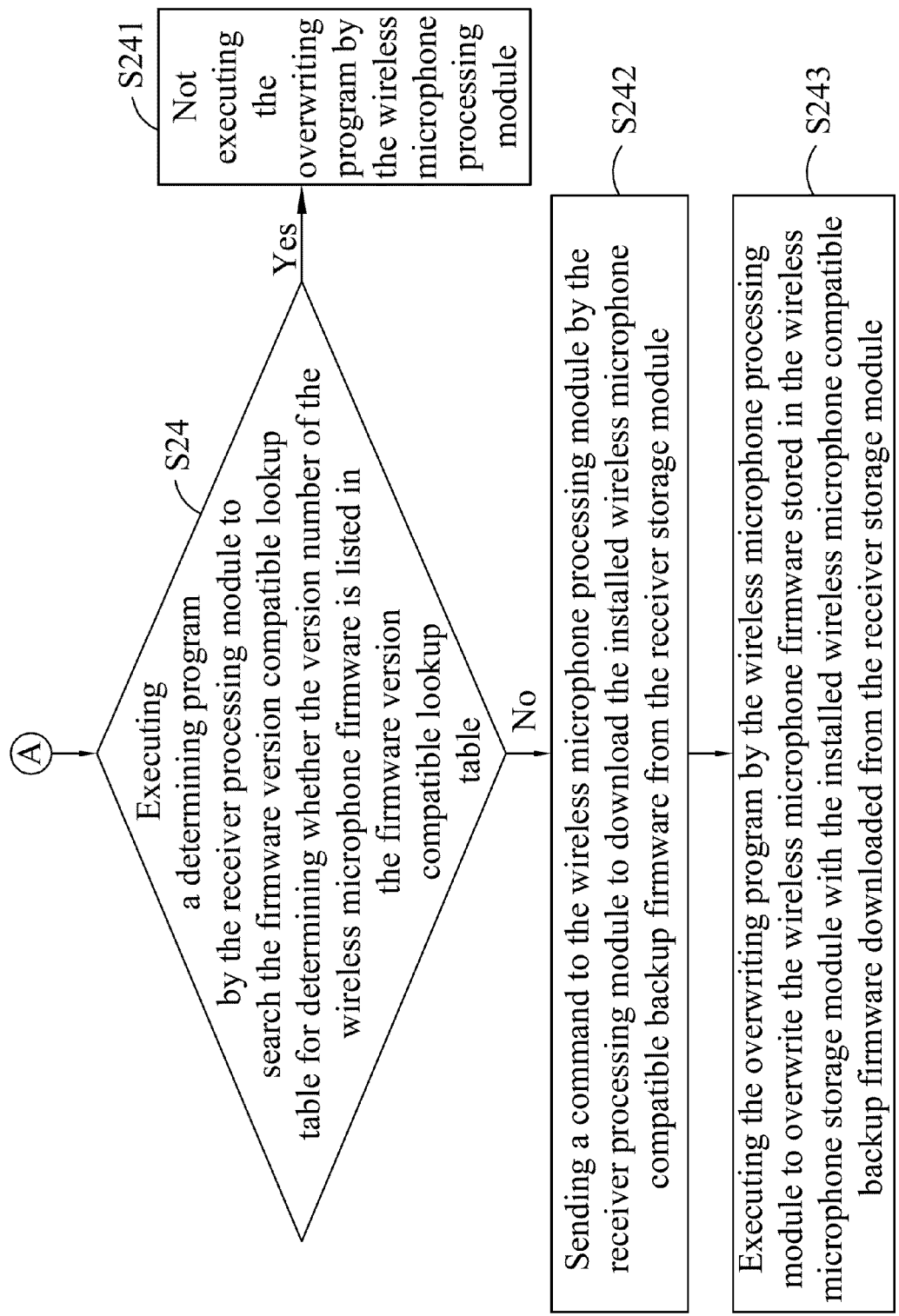

With reference to FIGS. 4A and 4B for flow charts of a firmware overwriting method applicable for paired use wireless microphone and receiver in accordance with one embodiment of the present invention, the steps of the method with the similar respective numerals of this preferred embodiment are similar to those as depicted in FIGS. 3A and 3B. However, the difference of this preferred embodiment comparing to FIGS. 3A and 3B reside on that the firmware overwriting method in the instant embodiment further comprises steps of installing a firmware package of a wireless microphone compatible backup firmware and a receiver firmware in the receiver storage module by the receiver processing module and searching a firmware version compatible lookup table to determine the compatibility between the receiver firmware and the wireless microphone firmware. The firmware overwriting method applicable for paired use wireless microphone and receiver in accordance with one embodiment of the present invention comprises the following steps: S21: installing a firmware package comprising a wireless microphone compatible backup firmware, a receiver firmware, and firmware version compatible lookup table in a receiver storage module; S22: building a connection between the at least one wireless microphone and the at least one receiver; S23: executing a determining program by a receiver processing module to determine if an installed wireless microphone compatible backup firmware is the same as a wireless microphone firmware; S231: not executing the overwriting program by a wireless microphone processing module; S24: executing a determining program by the receiver processing module to search the firmware version compatible lookup table for determining whether the version number of the wireless microphone firmware is listed in the firmware version compatible lookup table; S241: not executing the overwriting program by the wireless microphone processing module; S242: sending a command to the wireless microphone processing module by the receiver processing module to download the installed wireless microphone compatible backup firmware from the receiver storage module; and S243: executing the overwriting program by the wireless microphone processing module to overwrite the wireless microphone firmware stored in the wireless microphone storage module with the installed wireless microphone compatible backup firmware downloaded from the receiver storage module.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A firmware overwriting method applied to a paired use of at least one wireless microphone and at least one receiver,
in which each of the at least one wireless microphone comprising a wireless microphone processing module, a wireless microphone wireless transceiver module, and a wireless microphone storage module storing a wireless microphone firmware and an overwriting program; and
each of the at least one receiver comprising a receiver processing module, a receiver wireless transceiver module, and a receiver storage module storing a determining program, an installed receiver firmware and an installed wireless microphone compatible backup firmware that is compatible with the installed receiver firmware of that respective receiver, wherein the installed wireless microphone compatible backup firmware is an earlier version than the wireless microphone firmware, the firmware overwriting method comprising:
building a wireless connection between the at least one wireless microphone and the at least one receiver via the wireless microphone wireless transceiver module and the receiver wireless transceiver module;
in response to building a wireless connection, executing the determining program, by the receiver processing module, to determine if the installed wireless microphone compatible backup firmware is the same as the wireless microphone firmware;
when the installed wireless microphone compatible backup firmware is determined, by the determining module, to be the same as the wireless microphone firmware, the overwriting program is not executed by the wireless microphone processing module and the wireless microphone is paired with the at least one receiver;
when the installed wireless microphone compatible backup firmware is determined, by the determining module, to be different from the wireless microphone firmware, the receiver processing module sends a command to the wireless microphone processing module to download the installed wireless microphone compatible backup firmware from the receiver storage module; and
in response to said command, the overwriting program is executed by the wireless microphone processing module to overwrite the wireless microphone firmware stored in the wireless microphone storage module with the installed wireless microphone compatible backup firmware to pair the wireless microphone with the at least one receiver.

2. The firmware overwriting method of claim 1, further comprising a step of installing, by the receiver processing module, a firmware package of an external wireless microphone compatible backup firmware and an external receiver firmware in the receiver storage module before building the wireless connection.

3. The firmware overwriting method of claim 2, wherein the firmware package is installed in the receiver storage module after connecting to a computer with a wire or wirelessly, and the installed receiver firmware is overwritten by the external receiver firmware.

4. The firmware overwriting method of claim 2, wherein the firmware package further comprises a firmware version compatible lookup table or a version number digital discriminator.

5. The firmware overwriting method of claim 4, further comprising
executing, by the receiver processing module, the determining program to search the firmware version compatible lookup table and determine for determining whether a version number of the wireless microphone firmware is listed in the firmware version compatible lookup table, wherein the executing step takes place after the installed wireless microphone compatible backup firmware is determined to be different from the wireless microphone firmware by the determining program;

in response to the version number of the wireless microphone firmware being determined to be listed in the firmware version compatible lookup table, the overwriting program is not executed by the wireless microphone processing module; and in response to the version number of the wireless microphone firmware being determined to be not listed in the firmware version compatible lookup table, the receiver processing module sends a command to the wireless microphone processing module to download the installed wireless microphone compatible backup firmware from the receiver storage module, and the overwriting program is executed by the wireless microphone processing module to overwrite the wireless microphone firmware stored in the wireless microphone storage module with the installed wireless microphone compatible backup firmware downloaded from the receiver storage module.

6. The firmware overwriting method of claim 1, wherein the wireless connection is built through WiFi, radio frequency and Bluetooth.

7. The firmware overwriting method of claim 1, wherein the at least one wireless microphone and the at least one receiver are paired together by way of one-to-one, one-to-multiple or multiple-to-multiple.

* * * * *